United States Patent [19]
Brewster

[11] Patent Number: 5,570,981
[45] Date of Patent: Nov. 5, 1996

[54] LATCH DEVICE FOR SECURING CARGO CONTAINERS TO VEHICLE DECKS

[75] Inventor: John B. Brewster, Homewood, Ill.

[73] Assignee: Holland Company, Chicago Heights, Ill.

[21] Appl. No.: 153,369

[22] Filed: Nov. 16, 1993

[51] Int. Cl.$^6$ ....................................................... B60P 7/13
[52] U.S. Cl. ................................ 410/70; 410/69; 410/73; 410/76
[58] Field of Search ................................... 410/69–77, 80, 410/84, 90, 94; 248/503; 244/118.1; 114/75

[56] References Cited

U.S. PATENT DOCUMENTS

| | | | |
|---|---|---|---|
| 3,603,267 | 9/1971 | Schwiebert | 410/74 |
| 3,604,363 | 9/1971 | Smith | 410/70 |
| 3,604,364 | 9/1971 | Sweger | 105/366 C |
| 3,628,222 | 12/1971 | Palen | 410/69 |
| 3,630,155 | 12/1971 | Marulle | 105/366 D |
| 3,774,551 | 11/1973 | Sweger | 105/366 C |
| 4,236,853 | 12/1980 | Niggemeier et al. | 410/76 |
| 4,372,715 | 2/1983 | Naffa | 248/503 X |
| 4,382,734 | 5/1983 | Synowiec et al. | 410/70 |
| 4,382,735 | 5/1983 | Synowiec | 410/70 |
| 4,430,032 | 2/1984 | Morgan | 410/68 |
| 4,626,155 | 12/1986 | Hlinsky et al. | 410/82 |
| 5,090,638 | 2/1992 | Eilenstein-Wiegmanns | 244/118.1 |
| 5,106,247 | 4/1992 | Hove et al. | 410/73 |

FOREIGN PATENT DOCUMENTS

| | | | |
|---|---|---|---|
| 589031 | 12/1959 | Canada | 410/80 |

OTHER PUBLICATIONS

One sheet flyer entitled "The Holland ATL–Automatic Twist Lock", author unknown, publication date of Mar. 1990.
One sheet flyer entitled "Holland's ATL Container Securement System Fits All", author unknown, publication date unknown (believed to be published prior to Nov. 16, 1992).

*Primary Examiner*—Karen B. Merritt
*Assistant Examiner*—Stephen Gordon
*Attorney, Agent, or Firm*—David C. Brezina; Lee, Mann, Smith, McWilliams, Sweeney & Ohlson

[57] ABSTRACT

A cargo container hold down device that includes a shear block defining a base and housing therefore that is shaped so that the base forms a planar surfacing thereabout on which the cargo container corner fitting rests in the applied relation of the container relative to the supporting platform involved; the shear block housing pivotally mounts a latch device comprising a latch member that includes a nose portion having an upper cam surfacing for engagement by a correspondingly located container mounted corner fitting, and an under cam surfacing disposed for engagement by such correspondingly located container mounted corner fitting on removal of such container therefrom, the latch member being biased outwardly of the shear block housing to dispose the nose thereof over the container corner fitting supporting surface of the shear block housing, and including an element for withdrawing such latch member within the shear block housing about one pivot axis when the container is applied to the device, and an element for withdrawing such latch member within the shear block housing about a separate axis that is spaced from and parallels the first indicated pivot axis when the container is removed from such device, so as to achieve a smooth and easier loading of the container, and provide for increased force for cam positioning of the device latch member for container removal purposes.

3 Claims, 6 Drawing Sheets

LATCH DEVICE FOR SECURING CARGO CONTAINERS TO VEHICLE DECKS

BACKGROUND OF THE INVENTION

The invention relates to container securement devices, and more particularly, to improvements in cargo container securement devices of the type that provide automatic securement and release of a cargo container.

The shipping of lading and so-called cargo containers has become widely used due to advantages such as labor-saving resulting from decreased manual cargo handling. Cargo containers may be shipped from one geographical location to another geographical location using a variety of different carriers for such containers, including railroad cars, trucks, and ships. So-called "cargo containers" are basically of parallelepiped configuration and are conventionally provided at their corners with so-called "corner castings" that include locking openings used in securing such containers to the various types of vehicles on which they are loaded.

A primary use of container securement devices has been on, or in connection with, railroad cars, where such containers are typically loaded and unloaded with a crane, and where automatic entry and release are important. The present invention is concerned with this type of securement device, which invention has been devised for use in connection with cargo container corner castings of the type that have been approved by the American Association of Railroads, and that define a locking opening that, when the cargo container involved is to be secured to its carrier for transportation purposes, is horizontally exposed for cooperation with a similarly located securement device mounted on the carrier involved.

Among the objects of the present invention are to provide a securement device providing all the advantages of conventional such devices, to provide a cargo container securement device that permits automatic application and release of a cargo container with respect to same regardless of the type of carrier involved, or whether a pedestal is employed between the container latching device and the deck of the carrier involved, to provide a cargo securement arrangement that is useful both for securing a cargo container directly to any support surface or to the deck of the vehicle involved, to provide a cargo securement device that provides fully automatic entry and release of the container with respect to the carrier deck or platform involved, and to provide a cargo container securement device that overcomes the disadvantages of existing devices of this type.

The general nature of the Applicant's invention will be clarified by the following brief background discussion pertaining to the basic technology involved.

As has been previously indicated, the so-called "corner castings" that have been referred to are metal fittings that are suitably applied in all lower corners of cargo containers, which fittings, as has also been indicated, may be of the type specified in the standards of the Association of American Railroads. Each such corner fitting involved defines a quadrilaterally shaped opening leading to an internal chamber and defining a planar surfacing upon same that cooperates with the container so-called lock or securement device (carried by the transportation vehicle involved) that is to such cargo container at that corner.

Therefore, such conventional securement devices of the carrier involves four in number of same corresponding to the location of the cargo container lower corner fittings and is likely to include a shiftably mounted locking member that is secured to the securement device involved to permit application of the container thereto and provide a "stay put" function with respect to the carrier involved in its motion.

For any such cargo container support, the four container hold down devices involved are arranged in two pair of such devices at each end of the container, spaced apart as needed (lengthwise and transversely of the container) to serve to hold down or otherwise anchor to the carrier involved such cargo container at its four lower corners, and this calls for a pair of container securement devices to be affixed to the carrier involved where the specific ends of the cargo container are to be applied to the carrier involved.

In the illustrated arrangement, each pair of such devices for a particular container are thus located at the respective ends of the container that is to be anchored or otherwise secured to the vehicle involved (whether it be a railroad car or other vehicle). In accordance with the present invention, the container lock or securement devices each comprise a shear block defining a housing having a planar surfacing thereabout on which the container lower corner fittings, respectively rest.

Further in accordance with the present invention, each such container lock or securement device includes a special shiftably mounted latch member that is secured to the shear block involved to permit both application of the container thereto and removal therefrom, and provide as a "hold in place" function when the carrier involved is in motion.

Other objects, uses, and advantages will be obvious or become apparent from my consideration of the following detailed description and the application drawings, in which like reference numerals indicate like parts throughout the several views.

In the drawings:

FIGS. 4 through 10 illustrates sequential views that are concerned with the application (FIGS. 4–7) and removal (FIGS. 8–10) of a cargo container relative to a vehicle to which the Applicant's container lock or securement devices have been applied in the manner indicated, similar to the arrangement suggested by FIG. 1, with the drawing FIGS. involved in this series of views being in each case a vertical cross section view taken substantially on line 4—4 of the FIG. 3 (showing also the application container corner fitting the diagrammatic section);

However, it is to be distinctly understood that the drawing illustrations referred to are provided primarily to comply with the disclosure requirements of the Patent Laws, and that the invention is susceptible of modifications and variations that will be obvious to those skilled in the art, and that are intended to be covered by the appended claims.

Basic Description

Figure 1:
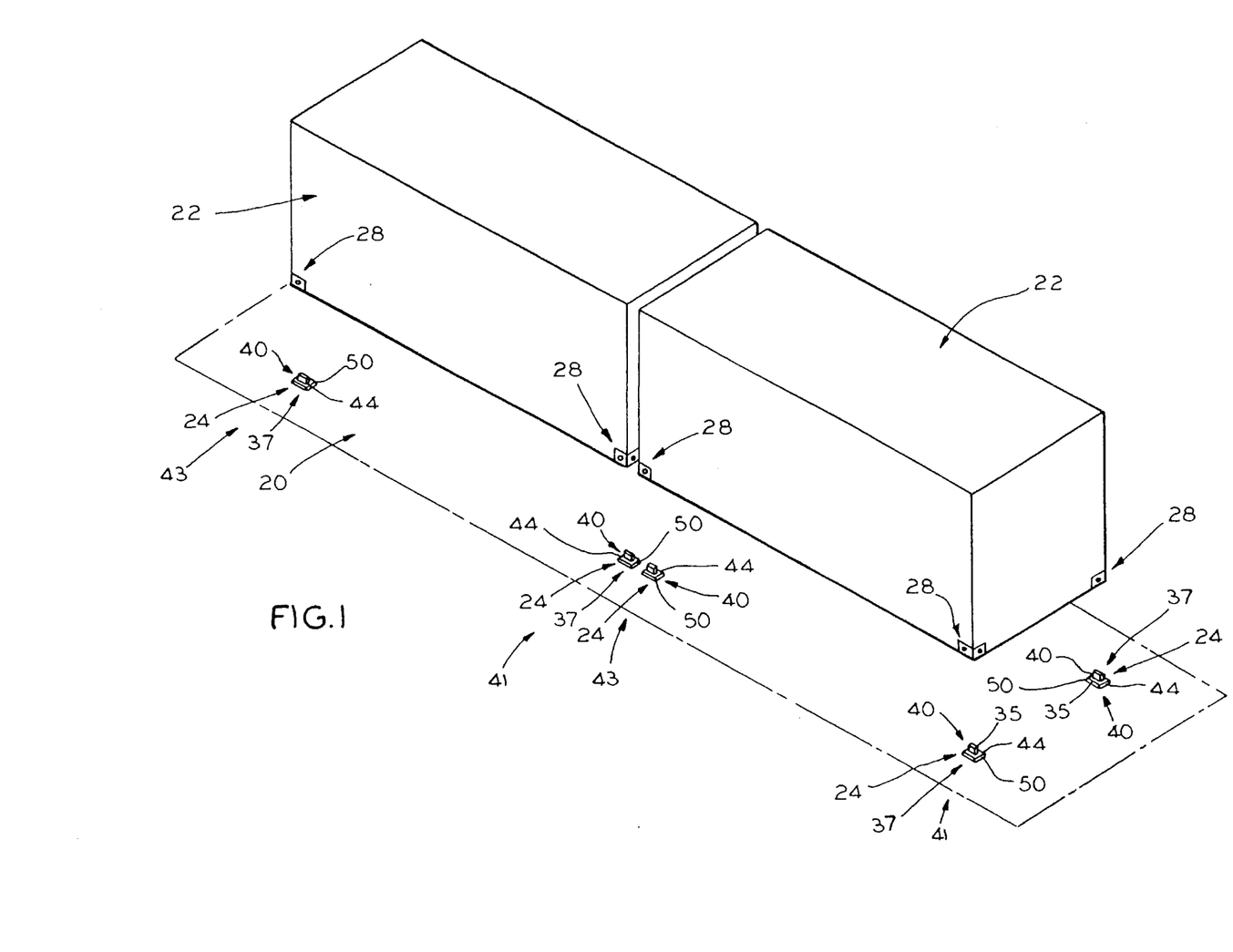
FIG. 1 is a largely schematic perspective view of a support surface to which the indicated pairs of container support or hold down devices have been applied, and several cargo containers to be supported thereon, which support surface may be, for instance, the deck of a railroad flat car.

Referring now to FIG. 1, there is illustrated in somewhat of a diagrammatic schematic manner a support 20 upon which a pair of cargo containers 22 are to be secured by Applicant's improved securement devices 24 that, in this regard, are arranged in accordance with FIGS. 2 through 11 of this application, and in accordance with the principles of the present invention herein disclosed. The support 20 may, for instance, be a deck or floor of a railroad flat car or other rail transport vehicle, or support 20 may be another type of vehicle to which the device 24 is applied in multiples of four for the usual application thereof to cargo container corner fittings 28 or the like.

The principles of the present invention are applicable to devices for securing various types of containers to various types of supports. In the illustrated embodiment of the invention, the cargo containers 22 are identical and are of the usual parallelepiped configuration that is involved in standard and modular forms of containers of this type as illustrated, each of the four lower corners of each container 22 includes a corner fitting 28 in the nature of a corner casting that may be of the type specified by the standards of the Association of American Railroads. The corner fitting 28 defines an upwardly or downwardly facing horizontal wall 30 (see FIG. 3) that defines an opening 32 that is of the familiar quadrilateral configuration. In accordance with the present invention, the securement devices 24 are intended to protrude through the locking opening 32 of the individual container corner fittings to achieve securement and automatic entry and release of the respective containers as hereinafter disclosed.

Figure 3:
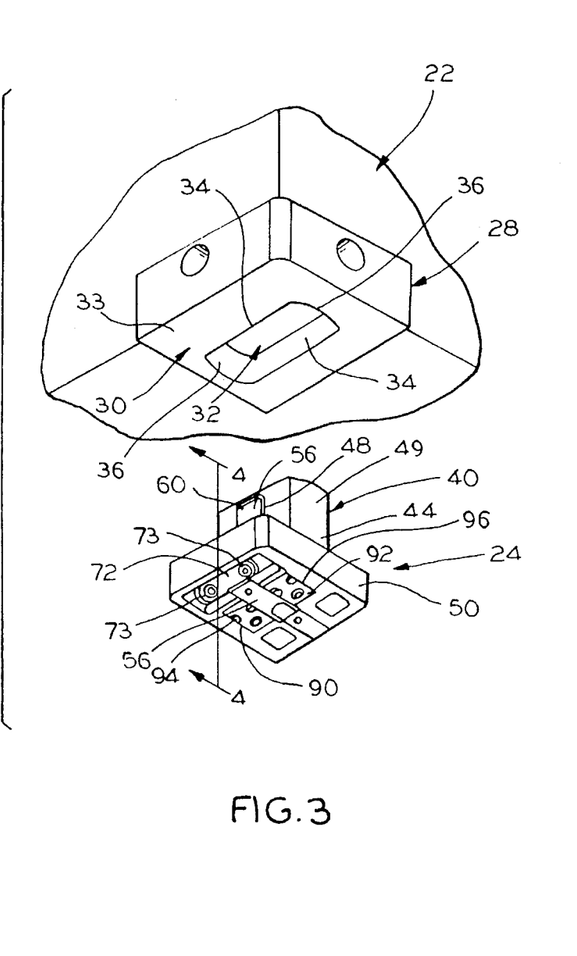
FIG. 3 is a diagrammatic perspective view showing the container lock or securement device of FIG. 2 assembled and disposed to receive the conventional lower corner fitting of a cargo container that is being lowered onto same; the securement device of FIG. 3 is shown deliberately separated from, for instance, a railroad car deck, that normally supports same, to expose the underside of same for disclosure purposes.

As best seen in FIG. 3, each locking opening 32 of the respective corner fittings 28 is of generally rectangular quadrilateral shape having a major axis parallel to the longitudinal dimension of the container 22 that is to be shipped. Each opening 32 of the respective container corner fittings 28 is defined by a perimeter including two relatively long side walls 34 joined by somewhat rounded relatively short end walls 36. The perimeter walls 34 and 36 of the respective corner fitting openings 32 extend between the external and internal surfaces of the horizontal walls 30 of the respective corner fittings 28. In order to affect securement of a container thereto, the locking openings 32 should be in general noncircular, and such openings 32 may have different configurations if so desired.

The lock or securement device 24 of the present invention is illustrated in detail in FIGS. 2 through 11, which will be described in detail hereinafter.

In connection with the use of these specific illustrated container lock or securement devices 24, it is preferred that for any support 20 such devices 24 be arranged into pairs 41 and 43 of oppositely facing such devices that are spaced apart as needed lengthwise and transversely of the support 20 involved to serve to hold or anchor to such support a specific container 22 at its four corners utilizing the hereinbefore referred to AAR specified corner fittings 28. In the illustrated arrangement, the devices 24 for each container 22 are disposed in such a manner that each pair of such devices at either end of the cargo container that is to be anchored to support 20 (whether it be a railroad car or other support) are disposed so that for each pair 41 and 43 of such devices 24, such devices are disposed in oppositely facing relation thereof with the backsides 35 facing each other, and the front sides thereof 37 facing away from each other.

The container block or hold down devices 24 each comprise a shear block 40, with a respective shear blocks 40 each defining a housing 44 that includes a laterally enlarged base 50 from which is upstanding a centering stud 51 that has a top 51a which forms the top 39 of the shear block itself. The shear block housing 44 defines an upwardly facing planar surfacing thereabout in the form of a seating surface on which the container 22 to be supported by the four indicated container locks or securement devices or units 24 is to rest.

Each device 24 further includes a shiftably mounted latch device 54 in the form a shiftably mounted latch member 56 that is secured to the respective shear blocks 40 in adjustable relation to permit the application of the container 22 that is to be supported thereby and provide the needed movement restraining function when the support 20 is put into motion (again, assuming that the support 20 is a railroad car, truck, or the like); in the illustrated arrangement, the container lock or securement devices 24 that form the respective pairs 41 and 43 of same and at each end of a container 22 are positioned with the back side 35 of same in opposition, with the front side 37 of same facing away from each other, as already indicated.

However, the positioning of the individual container lock or securement devices 24 at the ends of the respective containers 22 to be supported thereby is a matter that may be changed as needed by suitable practice of the skill in the art in connection with utilization of the Applicant's herein disclosed invention.

Turning now to the nature of each container lock or hold down device or unit 24 (see FIGS. 2 through 11) o Each such device unit thus comprises the indicated shear block 40 that in affect forms the indicated housing 44 for these devices or units 24, with the housing 44 being formed by the respective shear blocks 40 including a window opening 48 at the front side 37 of each such devices or units 24; the enlarged base 50 that is defined by each shear block housing 44 involved defines, as previously indicated, the surfacing 52 on which the container corner fitting downwardly facing surfacing 33 is to rest about the shear block centering stud 49.

As already indicated, the respective shear blocks 40 in forming the housing are shaped to also to form an upstanding centering stud 49, the top 51 of which forms a part of the top 39 of the respective devices or units 24. The window opening 48 is thus formed in the centering stud 49 on what is to be front side 37 of the respective units or devices 24.

The chamber 46 defined by each shear block housing 44 is enlarged at the housing base 50, and forms base walling 53 thereabout that defines planar surfacing 55 which is oriented relative to the housing centering stud 49 so that such centering stud 49 projects perpendicularly upwardly when the housing base 50 is fixedly applied to support 20 in the positioning indicated (as by welding or the like to form the joint between the base walling 53 and support 20, although other suitable means of affixing the respective housings 44 to whatever forms the surface 20 can be employed if so desired).

As has been also indicated, the latch device 54 of each container lock or securement device or unit 24 comprises a latch member 56 of special configuration; thus, latch member 56 comprises a body 56a that is pivotally mounted by pivot pin 64, and that is shaped and biased and guided (by insert body slats 66 and 68 respectively, formed faces 90a and 92a. Slot 66 and 68 accomplish this by their guide portions 46A and 46B) so that latch member 56 projects out of the window opening 48 on the front side 37 of each unit or device 24 (see for instance FIGS. 4, 7 and 11) that can be fully retracted within housing 44, and specifically chamber 46 when needed to apply or remove a container 22 with respect to the device or unit 24 that the latch member 56 forms a part of. Further, the pivotal mounting of the indicated latch member 56 is for pivotal movement in a plane that is perpendicular to the front and rear sides 35 and 37 of the respective devices or units 24, with such movement of the latch member 56 being obtained as a result of applying a specific container 22 to rest on a specific container lock or hold down device or unit 24.

Further, the body 56a (defining latch member 56) is shaped to define a concave side 59 and a convex side 57, with the nose portion 58 of the latch member 56 at its convex side 57 defining an upper convex cam surfacing 60 and an under or lower cam surfacing 62 that are to be engaged by the specific container fitting 28 that is to be applied and removed from the shear block 40 in which the latch member 56 is mounted.

Also, the latch member body 56a includes a tail end 70 that during the operation of the device as indicated by FIGS. 4 through 7 and 11 that is to engage a crossbar or plate 72 (that is suitably fixed across the bottom of the housing 44 involved), as by employing suitable screws 72a and 72b (see FIG. 2), for the purpose of providing a first pivot point 74 of the latch member 56 that is employed when applying a specific container 22 to a specific container lock or securement device 24.

The latch member body 56a adjacent its tail end 70 also defines a seat 76 for resilient cylindrical body 75. Further, the latch member body 56a at its convex side 57 is formed to define a seat 78 for one end 84 of the elongate pivotal spring type resilient member 80, the other end 86 of which is seated in the seat 88 therefor that is formed in housing base 50; as indicated in FIG. 2, the resilient body 80 at its end 84 is apertured as at 85 to slidably receive a guide pin 82 that is suitably mounted in the latch member 56a where indicated, for instance, in FIGS. 7 and 11.

With regard to the resilient body 75, it preferably is in the shape of a cylinder having flattened or planar ends 77, in the unstressed relation of same, with one end 77 of same fitting into the latch member seat 76 and the other end of same being free to seat itself and bear up against the internal wall of the housing 44. One material from which the body 75 is made can be polyurethane cast in the shape indicated, and having a hardness of 90A Durometer.

Figure 2:
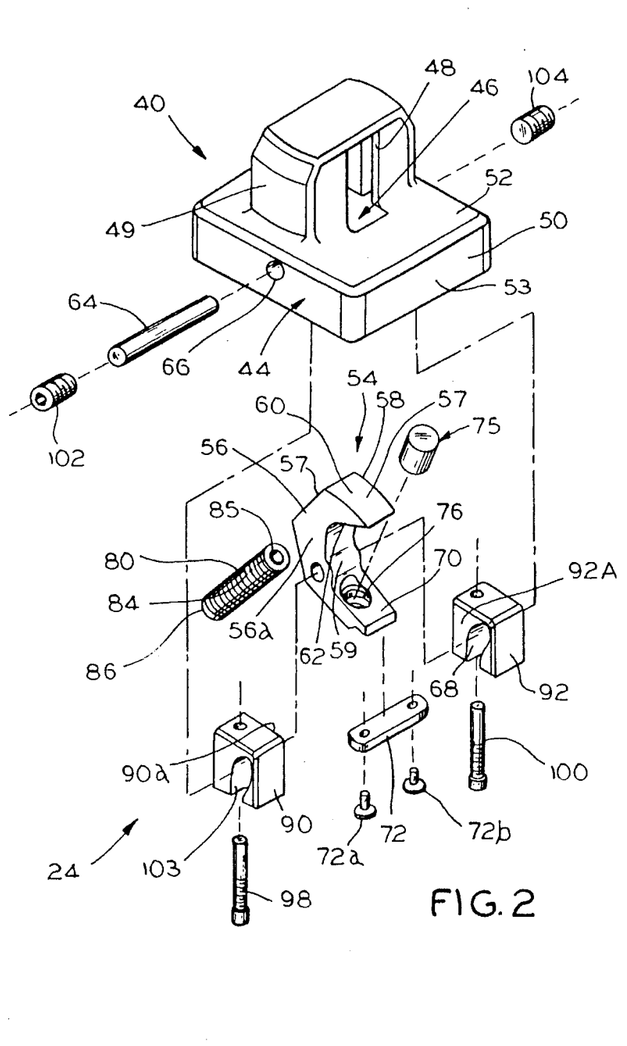
FIG. 2 is an exploded perspective view of one of the cargo container lock or securement devices arranged in accordance with the invention.

The resilient spring 80, on the other hand, is basically a coiled spring unit formed from coiled wire die spring and defines spring ends 84 and 86, with the end 84 of same being apertured as at 85, as indicated in FIG. 2, for sliding application thereto of the latch member pin 82. A preferred material for making the spring unit 80 is a high carbon oil tempered steel material having a spring stiffness on the order of 176 (+−15%) lbs. per square inch and it is to have a maximum solid length of 1.345 inches, with the direction of the helix involved being optional.

However, it is to be recognized that the two resilient components 75 and 80 as illustrated are provided for a specific application and their make-up is the result of a specific relation to the rotation and pivoting of the latch member 56 that is required to overcome specific installation or release loads when a container corner fitting is lifted onto or up off of a specific shear block. Thus, it is sometimes desired by the industry involved, to employ modifications in such resilient units of specific devices 24 using different materials, stiffness, or slightly different geometries, to modify the load as required for installation or release of the shifting container from a set of specific container lock or securement devices or units 24.

Figures 4, 5:
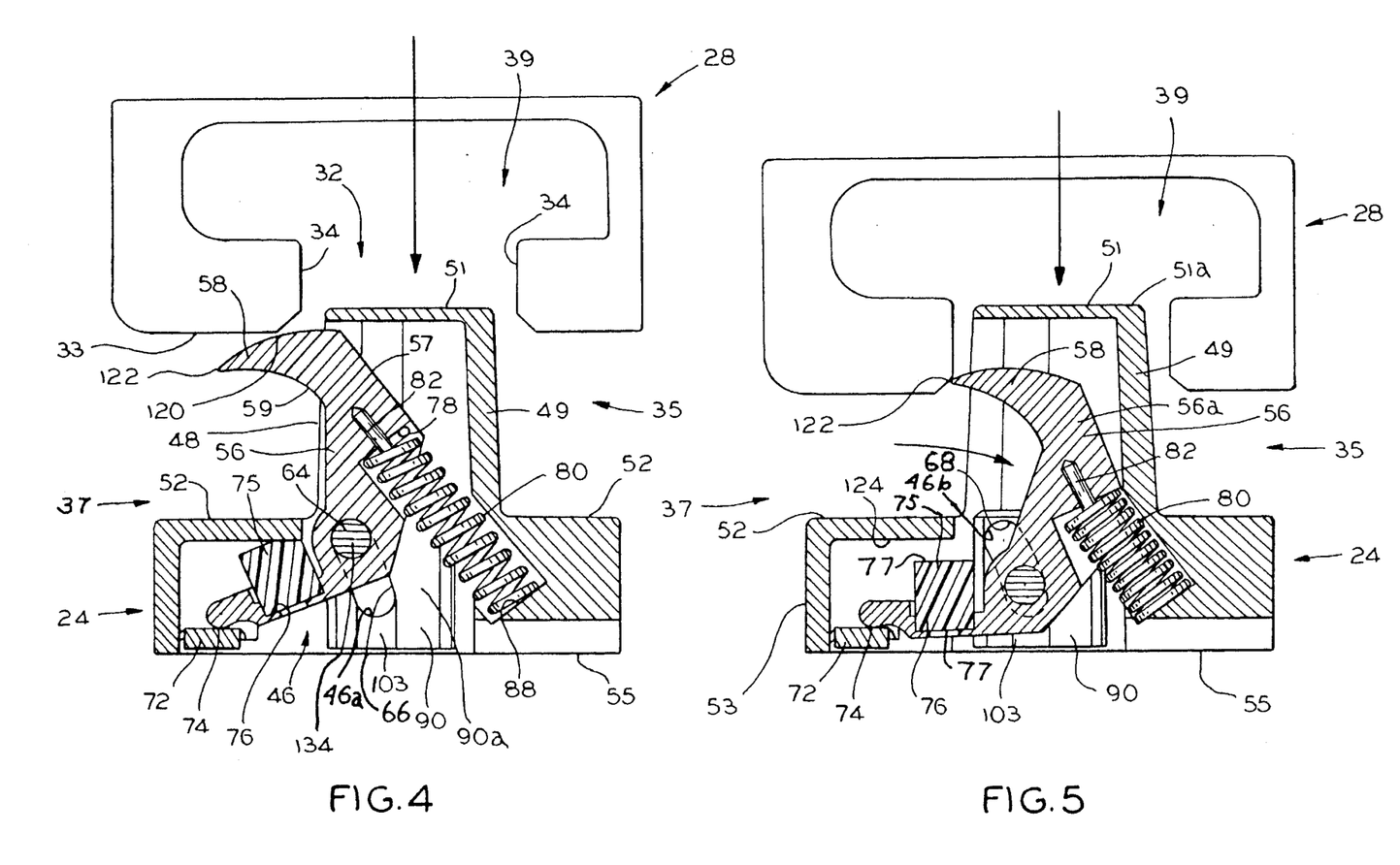
FIG. 4 illustrates the positioning of the Applicant's cargo container lock or securement device components in relation to the cargo container corner fitting that is to be applied to same, with the corner fitting involved being shown where it is just about to contact, on being lowered into securement position, the nose of the container lock or securement device latch member.
FIG. 5 is a view similar to that of FIG. 4, but illustrates the positioning of the cargo container lock or securement device latch member components on further lowering of the indicated container corner fitting with respect thereto.

As specifically indicated in FIGS. 2 and 4, the slots 66 and 68 where the pivot pin 64 is to be received may be formed in insert bodies 90 and 92 that fit within slots 94, 96 (see FIG. 3) provided therefor in the housing 44 of the basic container lock or securement device 24 that is involved. Such inserts 90 and 92 may be affixed in place in the manner indicated in the drawings, as by employing suitable screws 98 and 100, respectively (or any other suitable manner). It is also preferable to employ in the respective inserts 90 and 92 strengthening webs 103, as indicated in FIG. 3, to close off the lower ends of the respective slots 66 and 68.

Figure 6:
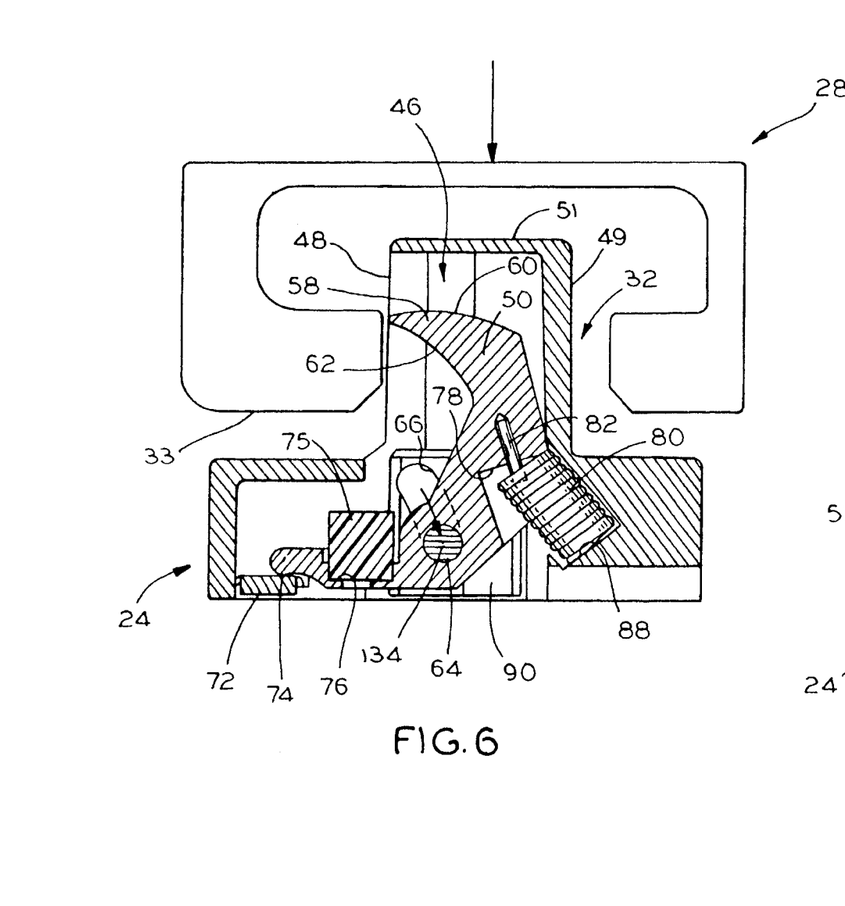
FIG. 6 is a view similar to that of FIG. 5, but showing the cargo container corner fitting in a further lower position, and showing the securement device latch member disposed in its extreme retraced position.
Figure 7:
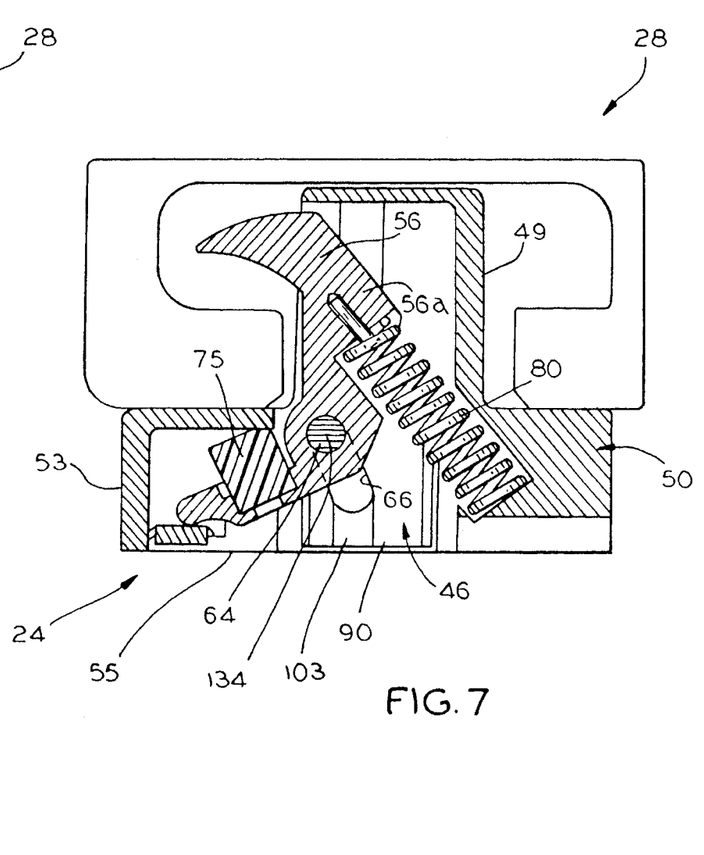
FIG. 7 is a view similar to FIGS. 4 through 6, with the indicated container corner fitting resting on the Applicant's illustrated cargo container lock or securement device, and properly secured in position, showing the latching member of same and its associated components in the container fully loaded position involved.
Figure 8:
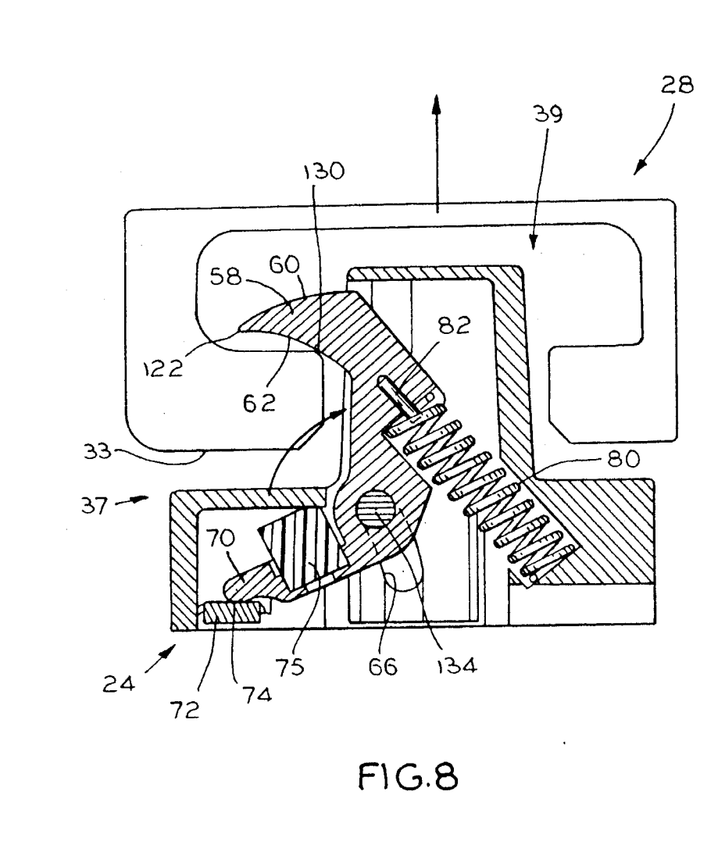
FIG. 8 is a view similar to those of FIGS. 4 through 7 illustrating the condition involved wherein the cargo container has just started being lifted upwardly and off the Applicant's locking or securement device that is shown in this Figure.
Figure 9:
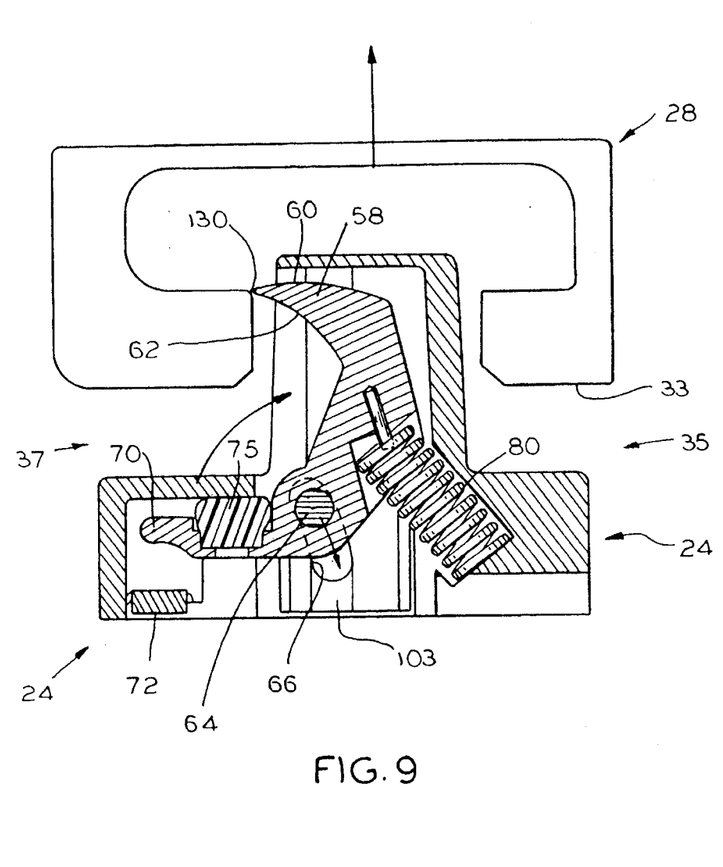
FIG. 9 is a view similar to that of FIG. 8, but illustrating the rising container corner fitting starting to clear the tip of the nose of the latch member of the Applicant's illustrated container lock or securement device, after the latch member involved has been deflected in accordance with the present invention to automatically accommodate removal of the container therefrom.
Figure 10:
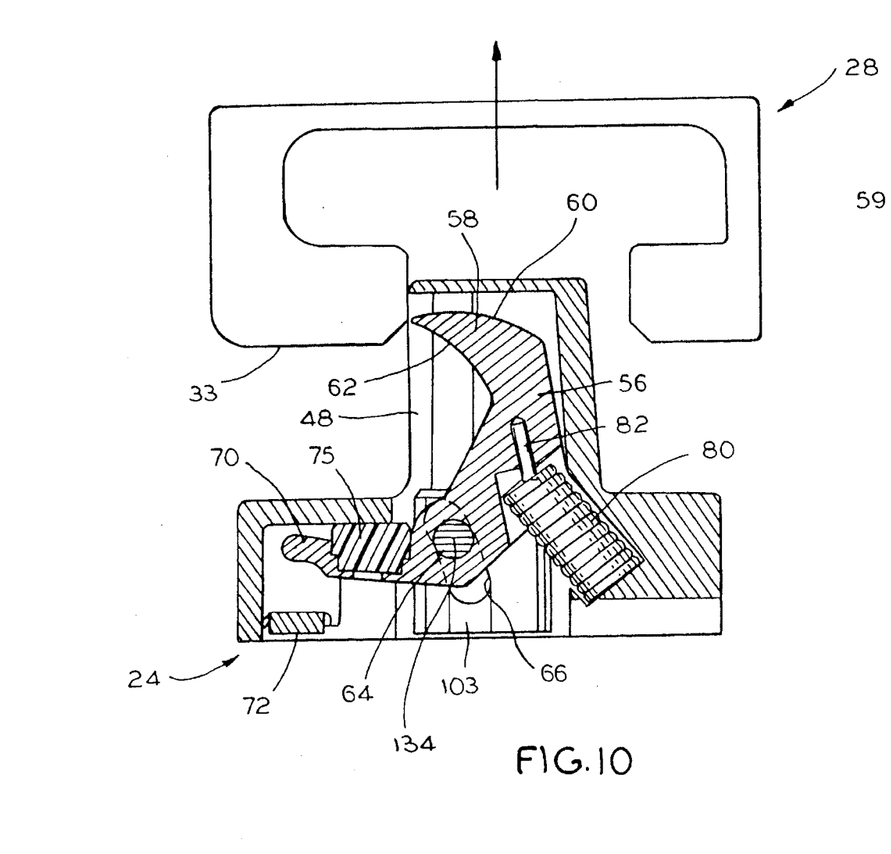
FIG. 10 is similar to FIG. 9, but illustrates the extreme deflected position that may be achieved by the Applicant's locking or securement device latching member, depending on the stiffness of the resilient springs employed and the geometry of the hold down device parts (the specifics of which may be subject to each customer's unique desires)

Reference is now made specifically to the showings of the respective FIGS. 4 through 11; and in this connection, FIGS. 4 through 7 show various views of the container corner fitting being lowered onto a particular container lock or securement device or unit 24, while showing of FIGS. 8 through 10 provide various views of a container corner fitting being raised off of a particular container lock or securement device 24. The specific drawing views involved will now be described in detail, with reference to the operation of the component parts involved. In this connection, the showings of these FIGS. are limited to a sectional view through a specific container lock or hold down device or unit 24 and a container corner fitting 28 that is associated with same, with the corner fitting 28 actually being showing in solid line outline in the form of a sectional view on the same plane as the sectional view is taken with regard to the container lock or securement unit that is involved.

The showing of FIG. 4 represents the situation where the container corner fitting 28 is being lowered onto a device or unit 24 and is "just about to" contact the nose portion 58 of the latch member 56, as at 120, the nose tip 122 being disposed by the resilient action of the spring 80 in overhanging relation to the housing surfacing 52 at the front side 37 of the device or unit 24, as the guide slots 66 and 68 of housing 44 arcuate about the latch member tail pivot point or axis 74 as a center, the latch member 56 in coming in contact between same and the lowering corner fitting 28 starts the movement of the latch member 56 back into the housing chamber 46 against the resilient action of spring 80.

In the showing of FIG. 5, the container corner fitting 28 is shown to be lowered further onto the device or unit 24, with a downward force on the latch member nose portion 58 having rotated the latch member from its position of FIG. 4 to its position of FIG. 5 about pivot point 74, against the resilient action of spring 80, and thereby compressing the spring 80 approximately as indicated. The pivot pin 64, having been centered between guide slots 66 and 68, moves downwardly in an arcuate manner to approximately the position of FIG. 5; both the latch member 56 and the spring 80 thus shift about access 74, with the resilient body 75 thus being displaced downwardly of the overlying housing wall 124 (whereby its resilient nature has no effect on the latch member 56).

In the showing of FIG. 6, the container corner fitting 28 is shown in a further lower position relative to the container lock or hold down device involved, with the latch member 56 shown positioned in its extreme retracted position in which it is disposed well within the housing chamber 46; in any event, at this point the resiliency of the spring unit 80 has the effect of biasing the latch member 56 to move back over the housing wall 124, to secure the container corner fitting 28 against motion relative to the device 24 on which it is to rest.

FIG. 7 shows the normal position of the component parts of the container hold down fitting and the container lock or hold down device therefor in what is considered the normally secured position of the container relative to the container lock or securement devices 24 that support same. In the position of FIG. 7, the latch member 56 and its pivot pin 64 have gone back to their normal positions under the bias provided by spring 80.

In the showing of FIG. 8, this illustrates the component parts involved when a container is being elevated to lift it off of the devices or units 24 on which it has been seated. As indicated in the showing of FIG. 8, the upper edging 130 of the container corner fitting that is adjacent the aperture 32, but is at the front side 37 of the device or unit 24 involved, is about to contact the latch member nose portion 58 under side cam surface 62, and as lifting continues, an upward force is applied to the latch member 56 which moves such member 56 upwardly, with the result that the latch member pivot pin 64 seats against the top of the respective guide slots 66 and 68. Continued lifting of the container involved causes the container corner fitting 28 shown in FIG. 8 to pivot latch member 56 about the pivot axis 134 that is provided by thus seated pivot pin 64, instead of rotating the latch member 56 about pivot point 74. This brings into operation the second pivot axis for the latch member that is contemplated by the present invention.

Referring now to the showing of FIG. 9, this view shows the container corner fitting involved where its edging 130 is positioned to clear the tip 122 of the latch member nose portion 58. The upward force that is now acting on the latch member 58 to effect the pivoting action about pivot access 134 has caused the tail 70 of the latch member 56 to unseat from the crossbar plate 72 and also cause the resilient body 75 to be compressed against the housing wall 124, whereby both spring units 75 and 80 are compressed. While in this position, the pivot pin 64 may retract down its guide slots 66 and 68 slightly, this may or may not actually happen and depends on the stiffness of the spring 75 and 80, and the friction and actual geometry of the parts involved in the device or unit 24 in question.

In the showing of FIG. 10, the container corner fitting illustrated is completely free of the device or unit 24 on which it has rested (as for transportation purposes) and the latch member 56 is shown fully retracted inside housing 44. Again, the actual physical location of the part involved will be dependent upon the stiffness of the springs 75 and 80 and the geometry of the parts involved in the respective devices or units 24.

Figure 11:
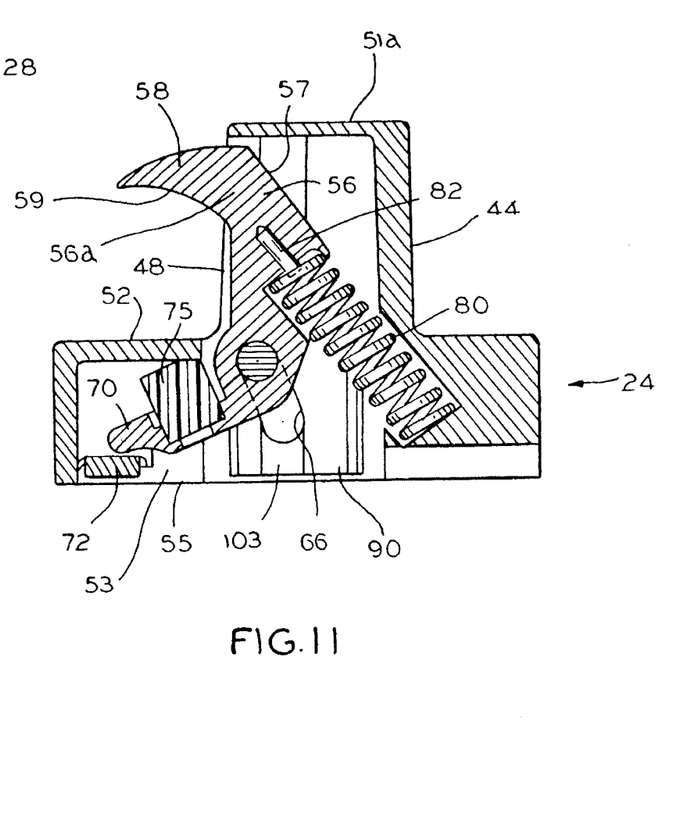
FIG. 11 illustrates the component parts of the Applicant's herein disclosed container lock or securement device in their normal position after a particular cargo container has been removed therefrom.

The showing of FIG. 11 illustrates the latch member 56 returned to its normal "hold down position" (corner fitting 28 having been totally removed) wherein the tail portion 70 of the latch member 56 engages cross plate 72 to form pivot point or axis 74, and the pivot pin 64 is seated against the upper ends of the respective grooves 66 and 68, under the action of the spring body 75 and spring unit 80, so as to dispose the nose portion 58 of the latch member 56 over the seat 52 defined by the housing 44 at the front side 37 of the container lock or securement device or unit.

Some of the novel features of the herein disclosed container lock or hold down device 24 are as follows:

The arrangement of the device 24 allows assembly and disassembly of the internal parts of same to be done above support 20. For instance, the latch member 56 and associated components including the springs 75 and 80 may be removed through the device or unit window opening 48 by removing one or the other of such groove members 102 and 104 and pivot pin 64; the replacement of a member 56 together with replacement compression units 75 and 80 (if desired) can be returned to operating position through window opening 48, and pivot pin 64 returned to housing 44 by way of the aperture 65, and appropriately centered between the respective nuts 102 and 104 (see FIG. 2).

The pivot points 74 and 134 of the latch member 56 are on either side of the points of contact of the container corner fitting for both raising and lowering of the container. Thus, the action of the container corner fitting with respect to convex cam surface 60, and action of the container corner fitting on the concave cam surface 62 are both in-between the pivotal axes indicated at 74 and 134. As to loading of the container onto the individual devices or units 24 is concerned, the pivot axis 134 is more effective for backing off the latch member nose portion 58 to the extent needed to withdraw a container corner fitting from a particular device or unit 24.

Another feature of distinction is seen in the lateral order of the basic components of device or unit 24, namely pivot point 74, spring body 75, pivot point 134, and spring 80.

While the specific arrangement of the herein disclosed device or unit 24 is unique in utilizing a nonmetallic spring body 75 as part of the biasing action that is to be applied to the latch member on removal of a container from a unit or device involved 24, and while the resilient body 75 is preferred for this purpose, it is contemplated that some suitable form of metallic spring unit may be employed to serve the purpose of resilient body 75.

It is also to be noted that the device or unit 24 is protected from top damage during container loading or otherwise.

Further, maintenance is easily done in connection with the devices or units 24 since such work may be performed above the support 20 rather than underneath it; thus no component parts of the device or unit 24 are located below the surface 20.

It is to be noted that both the top and back surfaces of the shear block involved are completely enclosed. The general arrangement of the shear block housing 44 has been devised to minimize contamination which can jam moving parts.

Units or devices 24 can readily be arranged to be adapted to the presently preferred low profile container corner fitting. While this requires shrinking the shear block geometry down to a height of 2-½ inches, this can readily be done in connection with the device or unit 24 that is illustrated in FIGS. 2 through 11.

The foregoing description and drawings are given merely to explain and illustrate the invention and the invention is not to be limited thereto, except insofar as appended claims are so limited, since those skilled in the art who have this disclosure before them will be able to make modifications and variations therein without departing from the scope of this invention.

What is claimed is:

1. For cargo containers of generally parallelepiped configuration, the four corners of the underside of which are each equipped with a corner fitting for purposes of securing the container to a support that is horizontally disposed, and with such container fittings being disposed in co-planar relation and respectively each defining a similar locking opening and a planar bearing surfacing that are respectively disposed adjacent such openings of the respective fittings, a container securement device for each of the respective corner fittings for securing the cargo container to a platform, said securement devices each comprising:

a shear block defining a front side, a top side, and a back side, with the shear block forming a base portion defining a planar force transmitting surfacing portion that extends to either side of the same, and a projecting portion that is generally normal to the planar bearing surfacing, said shear block further defining an internal chamber that in the projecting portion of said shear block is open at said front side of the same, said shear block base portion also defining a second force transmitting surfacing portion for engagement with such support, and including a latch member pivotally mounted in said chamber, for movement therein in a plane that is normally disposed relative to said front and rear sides of said shear block, and that is about a pivot axis that is normal of such plane, said latch member including a nose portion having an upper cam surfacing means for engagement by the bearing surfacing of a correspondingly located container mounted fitting, and an under cam surfacing means for engagement by the bearing surfacing of such correspondingly located container mounting fitting for removal of such container from such platform, resilient means for biasing said latch member to dispose said nose portion thereof exteriorly of said shear block opening in said front side thereof when said member cam surfacing means are not in use, said resilient means comprises:

a first resilient body interposed between a latch member tail portion and said base portion on one side of said latch member, and a second resilient member interposed between said latch member and said base portion on an opposite side of said latch member, means for effecting deflection of said latch member about said pivot axis to within a housing on engagement of a container being lowered with said latch member nose upper cam surfacing means, and means for effecting deflection of said latch member within the housing on engagement of a correspondingly located container corner fitting of a container being removed from such platform and about a separate axis spaced frontwise from and parallel to said pivot axis of said latch member, said separate axis is disposed adjacent the level of said second force transmitting surfacing portion.

2. The securement device set forth in claim 1, wherein the top and back sides of said shear block are imperforate.

3. A container securement device for each respective corner fitting of a lower side of a cargo container of parallelepiped configuration for securing the cargo container to a platform, said securement device comprising:

a shear block defining a front side, a top side, and a back side, with said shear block forming a base portion defining a planar force transmitting surfacing portion that extends to either side of the same, and a projection portion that is generally normal to said surfacing portion, said shear block further defining an internal chamber that in the projecting portion of the same is open at said front side of the same, said shear block base portion also defining a second force transmitting surfacing portion for engagement with such platform, and including a latch member pivotally mounted in said chamber, for movement therein a plane that is normally disposed relative to said front and rear sides of said shear block and that is about a pivot axis that is normal of such plane, said latch member including a nose portion having an upper cam surfacing means portion for engagement by a bearing surfacing of a correspondingly located container mounted corner fitting, and an under cam surfacing means for engagement by such bearing surfacing of such correspondingly located container mounted corner fitting upon removal of such container from such platform, resilient means for biasing said latch member to dispose said nose portion thereof exteriorly of said shear block opening in said front side thereof when said latch member cam surfacing means are not in use, said resilient means comprises:

a first resilient body interposed between a latch member tail portion and said base portion on one side of said latch member, and a second resilient member interposed between said latch member and said base portion on an opposite side of said latch member, a means for effecting the deflection of said latch member about said pivot axis to within a housing on engagement of a container being lowered with a latch member nose upper cam surfacing means, and a means for effecting deflection of said latch member within said housing on engagement of a correspondingly located container corner fitting of a container being removed form such platform about a separate axis spaced from and parallel to pivot of said latch member.

* * * * *